Nov. 10, 1959   E. C. HENDERSON   2,911,697
CORD FASTENER
Filed Jan. 13, 1956
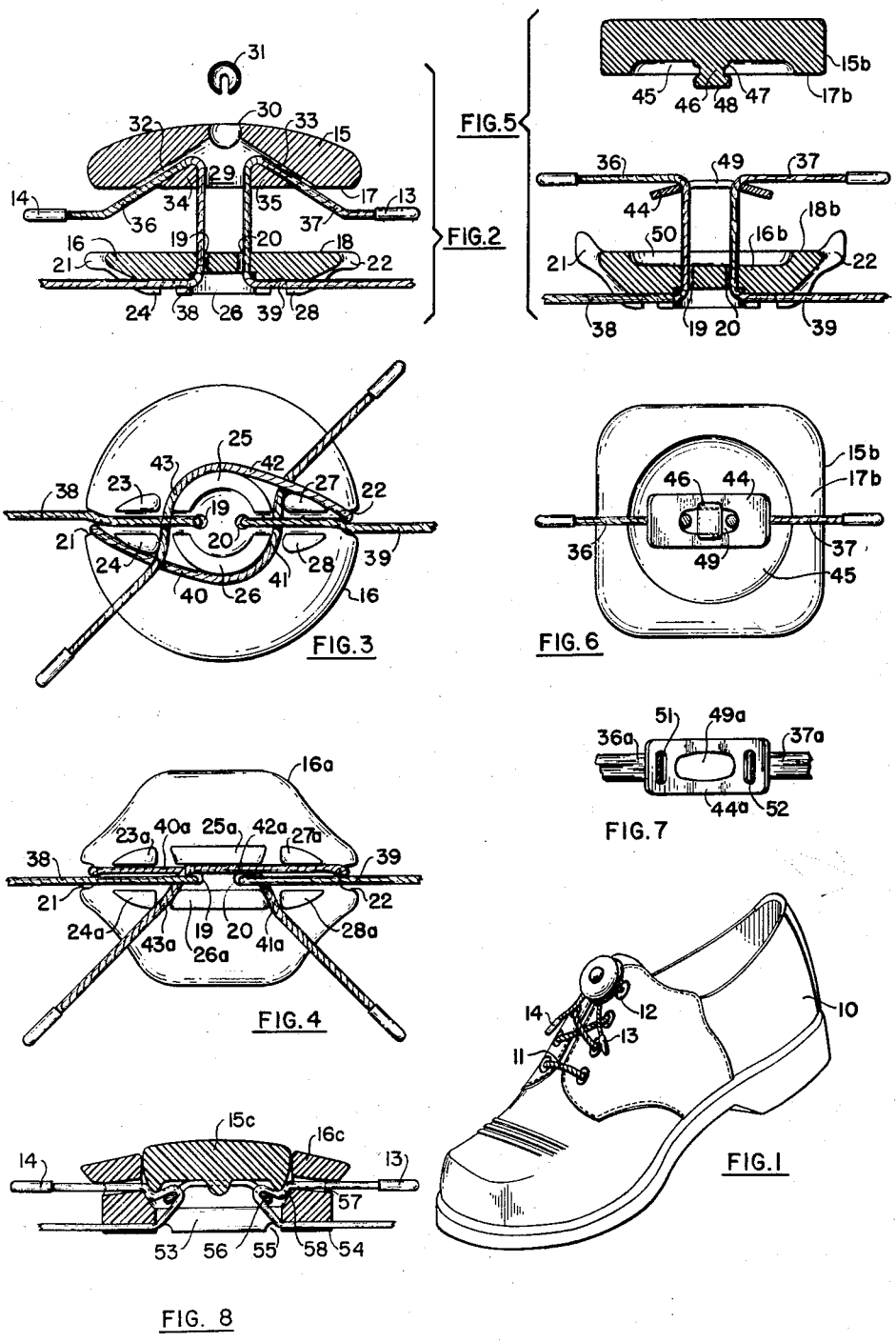

United States Patent Office 2,911,697
Patented Nov. 10, 1959

2,911,697
CORD FASTENER
Eldon C. Henderson, Paso Robles, Calif.
Application January 13, 1956, Serial No. 559,010
18 Claims. (Cl. 24—117)

This invention relates to a fastener for securing the flexible ends of cords, such as shoe laces, twisted or woven string, tape, twine or the like, for tying shoes, bundles or other articles; it relates further to a tied article of which the said fastener is a part.

There is frequent need for a simple, inexpensive and secure fastener which can be applied to flexible cord ends with a minimum of manipulation for securing the ends against parting motion. A particular example is the tying of shoe laces, which are customarily secured by a bow knot to facilitate subsequent untying. Many children, however, tie a knot in the nature of a granny knot as distinguished from a reef or square knot; the result is a knot which is relatively insecure and becomes undone by the alternate application and release in tension on the shoe lace upon walking. The knotting of shoe laces is, further, often time-consuming, especially for children and those charged with their care. There are also numerous other instances where the tying of a bow knot is desirable but time-consuming and awkward because of the need to maintain tension on the cord ends while completing the final part of the knot.

It is a primary object of this invention to provide a simple, inexpensive and durable fastener which will secure flexible cord ends in an adjusted position with a minimum of manipulation and which can be easily and rapidly released.

A further object is to provide a cord fastener which can be used either to produce a temporary clamping action on the cord ends, adequate for certain purposes, or, by performing a few simple additional manipulations, achieve a more lasting but nonetheless readily detachable fastening of the cord ends, and wherein the initial, temporary clamping obviates the need to hold the cord ends to maintain tension thereon while completing the second part of the fastening operation.

Further objects will become apparent from the following description.

In summary, the fastener comprises a pair of cooperating members, such as plates, providing opposed, juxtaposed clamping faces of any suitable configuration for clamping the flexible cord ends against slippage, the rear, base member or plate having at least one aperture through which the cord ends are passed forwardly, and the front member or plate having a cord-retaining element, such as a pair of holes formed therein or a separate clip which may be detachable or permanently secured thereto, through which holes or clip the cord ends emerging from the rear plate aperture are passed with a sliding fit and from which the cord ends emerge into the space between the said opposed clamping faces. As applied, for example, for securing shoe laces, the two flexible lace ends extend in meeting relation from the top eyelets of the shoe adjacent the rear face of the rear plate (the parts of the laces adjoining the said rear face and extending from the eyelets being herein called the standing parts), forwardly through the aperture in the rear plate, as loops through the cord-retaining element, thence between said clamping faces and projectingly beyond the plates, preferably in opposite directions. To fasten the shoe lace it is necessary merely to pull the lace ends in opposed directions, causing them to slide through the aperture and the cord-retaining element; when all slack has been taken up the rear plate is in engagement with the shoe and the front plate is pulled by its cord-retaining element toward the rear plate to bring the clamping faces together and clamp the cord ends between them. This produces a temporary fastening. The fastening can be undone by simply lifting the front plate, which releases the clamping action and causes the cord ends to slide through the cord-retaining element.

According to another feature of the invention, a more secure fastening is made by first making the above-described temporary fastening, thereafter drawing the projecting lace ends around the marginal edge of the lower plate, suitable spaced recesses, such as holes or open notches, being advantageously provided at the said edge to position the laces, which are passed along the rear face of the rear plate and thence between the standing parts of the lace, where they are pressed frictionally against the rear plate. The rear face of the rear plate is preferably shaped to provide one or more cord-retaining shoulders to retain the lace ends under the said standing parts.

The invention will be described further in connection with the accompanying drawing forming a part of this specification and showing certain preferred embodiments, wherein:

Figure 1 is a perspective view of a laced shoe to which one form of the fastener has been applied to secure the lace ends;

Figure 2 is a longitudinal sectional view through the center of the fastener in open position, the closure being shown removed from the front plate;

Figure 3 is a bottom plan view of the lower plate;

Figure 4 is a bottom plan view of a modified form of the lower plate;

Figure 5 is a longitudinal sectional view through another modified form of the fastener, the cord-retaining clip being shown separated from the front plate, which is shown rotated a quarter turn from its normal position when fast to the plate;

Figure 6 is a bottom plan view of the upper plate of Figure 5 showing the clip attached to the plate, the cord being shown partly in section;

Figure 7 is a bottom plan view of a modified form of the detachable cord-retaining clip; and Figure 8 is a longitudinal sectional view through still another modified form of the fastener, showing the parts when effecting a temporary clamping action on the cords.

Referring to Figures 1–3 of the drawing, wherein like reference numbers designate like parts throughout, there is illustrated a laced shoe 10 having a conventional shoe lace or cord 11 that is passed through the eyelets 12 on the shoe. The cord ends extending out from the uppermost eyelets may have the usual rigid tips 13 and 14, and it is the purpose of the fastener described below to secure these ends.

The fastener comprises a rear, base member 16, which may be formed as a plate, and an independent front member, such as a plate 15, both of which may be of any suitable rigid or semi-rigid material, such as a synthetic resin plastic indicated by the cross hatching, although metal or wood can be used. These plates have opposed clamping faces 18 and 17, respectively. The rear plate has adjacent the central part thereof a pair of closely spaced apertures 19 and 20 which extend through the plate and are slightly larger than the cord, When intended for making a secure, as contrasted with a temporary, connection the lower plate 16 advantageously has the following added features: The marginal edge has a pair of spaced recesses or open notches 21 and 22 which are preferably substantially in spanning relation to the apertures; and the rear or bottom face has six raised portions or bosses 23—28 which are advantageously shaped and positioned as shown in Figure 3. These bosses provide a pair of channels extending in opposite directions from the respective apertures to the recesses, the left channel being between the bosses 23 and 24 and between the left ends of the bosses 25 and 26, and the right channel being between the bosses 27 and 28 and between the right ends of the bosses 25 and 26. These bosses further define four transverse channels, respectively in the intervals between the bosses 23 and 25, 24 and 26, 25 and 27, and 26 and 28.

The upper plate has a large central hole 29 which extends therethrough and has an inwardly projecting lip 30 at the upper extremity for retaining a closure, such as an ornamental metallic sphere 31 having a slot as shown so as to be resiliently compressible. The plate further has a pair of lateral holes 32 and 33 which are inclined and which intersect the central hole between the faces of the plate and the rear face 17 between the central hole and the marginal edge of the plate. The lateral holes are slightly larger than the cord for receiving the latter with a sliding fit. The integral plate portions 34 and 35 which lie between the central hole and the lateral holes form cord-retaining elements.

To assemble the fastener, the cord ends are passed first through the apertures 19 and 20 toward the front and thereafter looped about the cord-retaining elements 34 and 35, as shown in Figure 2. This looping is readily accomplished by first pushing both cord ends entirely through the central hole 29 and then individually down through the respective holes 32 and 33. The resilient sphere 31 can then be pushed into the hole, in which it is retained by the lip 30.

To tie the shoe and make a temporary fastening, the cord ends are first pulled through the eyelets 12 to make them taut. They are then secured by the single operation of pulling the cord ends which project from the inter-plate space in opposite directions. The cord ends thereby slide through the apertures and holes until the rear plate bears against the shoe and the front plate is pulled rearwardly to clamp the parts 36 and 37 of the cord ends between the clamping faces 17 and 18. The standing parts 38 and 39 of the cord ends then extend parallel to and are in engagement with the rear face of the rear plate, which is preferably oriented to place the said standing parts within the channels that extend out from the apertures, as shown in Figures 2 and 3. Tension on these standing parts pulls the front plate more tightly toward the rear plate, due to the slight friction between the clamped parts 36 and 37 and the clamping faces, and this, in turn, increases the clamping action. Such a temporary fastening, while sufficient for some purposes, such as for wearing the shoes for limited periods, e.g., in the home, or for holding the cord ends while completing the more secure fastening described below, will gradually become loose when tension on the standing parts of the cord ends is intermittently released.

To make a more durable fastening, as illustrated in Figure 3, the cord ends projecting from the inter-plate space are drawn into the recesses 21 and 22, respectively and onto the rear space of the rear plate. The end from the recess 21 is passed along the outer margins of the bosses 24 and 26 as shown at 40 and thence beyond the right end of the plate and above the standing part 39 of the other end (i.e., below that part as viewed in Figure 3); it is then pulled toward the center of the plate until it falls into the transverse channels between the bosses 25 and 26 on the one side and the bosses 27 and 28 on the other, as shown at 41. It will be noted that the part 41 is pressed against the plate by the standing part of the cord and that the bosses 27 and 28 provide cord-retaining shoulders directed toward the apertures for retaining the part 41 in position. As is shown in Figure 2, the lower faces of the bosses 27 and 28 slope upwards toward the marginal recess 22 to facilitate wedging the part 41 between the standing part and the plate during the last-described pulling step; similar slopes are provided on the bosses 23 and 24. The cord end from the recess 22 is next passed along the outer margins of the bosses 27 and 25, as shown at 42, and thence beyond the left end of the plate and over the standing part 38 of the other cord end; it is then pulled toward the center of the plate until it falls into the transverse channels between the bosses 25 and 26 on the one hand and the bosses 23 and 24 on the other, as shown at 43, in which position it is held by the pressure of the said standing part and by the shoulders provided by the bosses 23 and 24. It is evident that the operations of drawing each cord in succession into its recess, about the outer margins of the bosses and into its transverse channels are easily learned and executed and can be completed rapidly.

Figure 4 shows the rear face of a rear plate 16a according to a modified construction which may be used in combination with the front plate 15 previously described for Figure 2; it has a pair of central apertures 19 and 20, a pair of spaced marginal recesses 21 and 22, and a front clamping face, as does the plate 16, but is narrower. The bosses have outlines to occupy only a narrow belt along the axis through the recesses and apertures, and the three bosses on one side of said axis are spaced from those on the other side of the axis so that the intermediate central channels can accommodate several cords side by side. The lower faces of the bosses 23a, 24a, 27a and 28a (which appear upwards in Figure 4) are sloped upwards toward the recesses 21 and 22, in the manner shown for the bosses 23 and 27 in Figure 2, and these four bosses are spaced from the center bosses 25a and 26a to provide transverse channels.

The rear plate 16a is assembled to the front plate 15 of Figure 2 to make a temporary fastening as previously described. It can then be used to make the more secure fastening described for Figure 3 or to make a modified fastening shown in Figure 4. To make this modified fastening after the temporary fastening has been made, one cord end from the interplate space is drawn through the left recess 21, through the central channels as shown at 40a, beyond the right end of the plate, over the standing part 39 of the other cord end, and finally pulled toward the central part of the plate until it falls into the transverse channel between the bosses 26a and 28a, as shown at 41a; in this position it is pressed against the plate by the said standing part and retained by the shoulder of the boss 28a. The other cord end is then drawn through the right recess 22, through the central channels as shown at 42a, beyond the left end of the plate, over the standing part 38 of the other cord end, and finally pulled toward the center of the plate until it falls into the transverse channel between the bosses 26a and 24a, as shown at 43a; in this position it is pressed against the plate by the said standing part and retained by the shoulder of the boss 24a. It may be noted that only two of the four transverse channels are employed in this fastening; four are, however, preferably provided to present a symmetrical arrangement which makes it possible to bring the extreme ends out on either side of the plate.

Figures 5 and 6 show a modified construction of the fastener which differs principally in that the upper or front plate 15b is provided with a detachable metal clip 44 which constitutes the cord-retaining means. The plate has a marginal clamping face 17b surrounding a depression 45 which accommodates the clip 44. An integral stud 46 projects down from the center of the plate and has a pair of flat recesses 47 on opposite sides thereof adjoining lateral flanges 48. The clip has an elongated hole 49 sufficiently large to receive the flanges 48 and as wide as the distance between the recesses 47; it is advantageously resilient, but this is not essential when the stud is resilient. The clip is assembled to the stud by pushing the latter through the hole 49 in the relative orientations shown in Figure 5 and giving the clip a quarter turn; the slight deformation in the clip and/or the stud required to effect this turning secures the clip and prevents adventitious rotation which would permit detachment of the clip. The hole 49 is slightly wider at the central portion, whereby the clip is centered to leave a part of the hole exposed on each side of the stud. The end portions of the clip are preferably bent down as shown.

The lower or rear plate 16b has a central depression 50 to accommodate the clip on the front side thereof and a pair of clamping faces 18b opposite the clamping face 17b; it also has a pair of central apertures 19 and 20 and spaced marginal recesses 21 and 22. The rear face is formed with six bosses, which may be arranged as desired, e.g., either as shown in Figure 3 or as shown in Figure 4.

To assemble the fastener of Figures 5 and 6, the clip 44 is first separated from the front plate and the two cord ends are passed forwardly through the respective apertures 19 and 20 and then through the hole 49 of the clip, as shown in Figure 5. The clip is then assembled to the stud by inserting the latter into the hole 49 and making a quarter turn; the two cord ends then have sliding fits through the two exposed parts of the clip hole, as shown in Figure 6. The fastener can then be used to make any of the fastenings described for Figures 1–4.

Figure 7 shows a modified construction of the detachable clip 44a, which has a central hole 49a shaped for attachment to the stud 46 of the front plate and a pair of transversely elongated holes 51 and 52 through which the two cord ends are looped. This construction is desirable when the cord is in the shape of flat band, as shown at 36a and 37a.

Figure 8 illustrates a fastener which embodies several further modifications. The rear plate 16c has a single, large central aperture 53 for receiving both cord ends, shown to be shaped as flat bands. The rear face of this plate may have aligned grooves 54 at the end portions defined by bosses, similar to the bosses 23a and 24a, and to the bosses 27a and 28a of Figure 4, to position the standing parts of the cords and, when intended for making the more secure fastening, a pair of transverse, cord-retaining grooves 55 defined by bosses similar to the said bosses and the central bosses 25a and 26a of the same figure, in the side portions, for retaining the cord ends under the standing parts. It is evident that, when used to make the fastening described for Figure 4, the latter grooves are the equivalent of the transverse channels which receive the cord parts 41a and 43a.

The rear plate 16c has the end portions raised toward the front to receive the front plate 15c in partly recessed relation, as shown. The latter plate carries a cord-retaining element in the form of a metal clip 56 which is cemented or otherwise permanently secured to the front plate. The spaced marginal recesses in the rear plate are, in this embodiment, holes 57 that extend through the said raised end portions, the inner ends of these holes being situated forwardly of the rearmost part of the adjacent edge of the front plate when the latter is in the rear, operative position shown, so as to pinch or clamp the cord ends as shown at 58. It is evident that the surfaces of the plates in contact with the cord parts 58 constitute the opposed clamping faces which are, in instance, not flat but inclined convergent toward the rear.

The fastener shown in Figure 8 can be used to make the temporary fastening by pulling the cord ends which extend out from the holes 57 in opposite directions. This draws the front plate 15c toward the rear because of the action of the cord ends on the clip 56 until the cord parts 58 are clamped. The more secure fastening can thereafter be made by drawing the projecting cord ends along the grooves 54 and into the transverse grooves 55 in the manner previously described for Figure 4.

I claim as my invention:

1. A tied article having a front surface, a pair of flexible cord ends having standing parts extending in meeting relation along said surface, and a fastener for said cord ends including a rear, base member and an independent front member which is movable bodily away from the base member, said members being shaped to provide opposed clamping faces which are movable toward each other to clamp said cord ends therebetween, said base member being positioned above said standing parts, being extended laterally to engage the said surface of the article, and having inwardly from the margin thereof at least one aperture through which said cord ends are passed to the front, the front member having a cord-retaining element on which said ends, after passing through said aperture, are looped with sliding fits and from which said ends extend divergently between said clamping faces in clamped relation, said base member being shaped to provide a pair of passageways situated laterally from said clamping faces and said cord ends, after emerging from said clamping faces, being positioned within said passageways.

2. A tied article according to claim 1 wherein said clamping faces are substantially flat and coplanar.

3. A tied article according to claim 1 wherein said clamping faces are convergent toward the rear.

4. A fastener for securing a pair of flexible cord ends comprising a base member having at least one aperture adjacent the central part thereof for forward passage of the cord ends, and an independent front member movable bodily away from the base member, said members providing pairs of opposed clamping faces situated in divergent directions from said aperture, the front member having a pair of cord-retaining elements shaped to receive said cord ends with sliding fits after emerging from said aperture and to conduct said ends in divergent directions into the spaces between said clamping faces and said base member providing a pair of passageways situated laterally from said clamping faces and shaped to receive said cord ends after emerging from said clamping faces.

5. A fastener according to claim 4 wherein marginal portions of said front member intermediate said clamping faces are exposed, whereby said front member can be grasped to pull it bodily away from the base member to release the cord ends.

6. A fastener according to claim 4 wherein said rear member extends forwardly of the rear of the front member to provide at least a pair of front parts which are situated in spanning relation thereto, said passageways for receiving said cord ends being formed in said front parts.

7. A fastener for securing a pair of flexible cord ends comprising a base member having an extended rear surface adapted for engagement with an article and having at least one aperture adjacent the central part thereof for forward passage of the cord ends, and an independent front member having an area extending beyond the said aperture and continuously closed at the front thereof, said members providing pairs of opposed clamping faces situated in divergent directions from said aperture, the front member having at the rear thereof a pair of cord-retaining supports over which said cord ends are passed with sliding fits after emerging from said aperture and from which said cord ends are passed in divergent directions into the spaces between said clamping faces and said rear member having a passageway within which a cord end can be placed, said passageway extending laterally from said clamping faces.

8. A fastener for securing a pair of flexible cord ends comprising a rear, base plate and a front clamping member, said plate and member being shaped to provide opposed clamping faces which are movable toward each other to clamp said cord ends therebetween, the base plate having at least one aperture adjacent the central part thereof for forward passage of the cord ends, the front member having a pair of cord-retaining elements shaped to receive said ends with sliding fits after emerging from said base plate aperture and to conduct said ends divergently into the space between said clamping faces, said rear plate including forwardly raised portions situated in spanning relation to said aperture and spaced to receive said front member therebetween in at least partly recessed relation, each of said raised portions having a hole for receiving one of said cord ends.

9. A fastener according to claim 8 wherein said clamping faces are formed between inner surfaces of said raised portions and the marginal portions of the front member.

10. A fastener for securing a pair of flexible cord ends comprising a rear, base plate and a front member shaped to provide opposed clamping faces on the plate and member which are movable apart and toward each other to clamp said cord ends therebetween, the rear plate having at least one aperture adjacent the central part thereof for forward passage of the cord ends, the front member having a pair of cord-retaining elements shaped to receive said cord ends with sliding fits after emerging from said rear plate aperture and to conduct said ends divergently into the space between said clamping faces, said rear plate having the rear face thereof shaped to provide a pair of channels extending in divergent directions from said aperture for positioning standing parts of said cord ends which extend along said rear face, and additional channels extending transversely to the first-mentioned channels on opposite sides of the central part of the plate for positioning portions of the cord ends which are passed between said rear face and the said standing cord parts.

11. A fastener for securing a pair of flexible cord ends having standing parts comprising a rear, base plate adapted to overlie said standing parts and having at least one aperture inwardly from the margin thereof for the forward passage of said cord ends and a front member which is movable relatively to the base member, said plate and member providing opposed clamping faces which are movable toward each other to clamp said cord ends therebetween, the front member having cord-retaining elements shaped to receive said cord ends with sliding fits after emerging from said aperture and to conduct said ends into the space between said clamping faces, the rear face of the base plate being shaped to provide a cord-retaining shoulder situated to one side of and facing the central part of the plate for positioning a portion of one of said cord ends which is passed, after emerging from said clamping faces, between the rear face and a standing cord part.

12. A tied article according to claim 1 wherein said cord ends, after emerging from said passageways, are drawn onto the rear face of the base member, said cord ends passing thence along said rear face and being wedged between said rear face and at least one standing part of a cord end.

13. A tied article having a front surface, a pair of flexible cord ends having standing parts extending in meeting relation along said surface, and a fastener for said cord ends including a rear, base member and an independent front member which is movable bodily away from the base member, said members being shaped to provide opposed clamping faces which are movable toward each other to clamp said cord ends therebetween, said base member being positioned above said standing parts, being extended laterally to engage the said surface of the article, and having inwardly from the margin thereof at least one aperture through which said cord ends are passed to the front, the front member having cord-retaining elements on which said ends, after passing through said aperture, are looped with sliding fits and from which said ends extend between said clamping faces in clamped relation, said ends, after emerging from said clamping faces, being drawn onto the rear of the base member and beyond said aperture and thence wedged between said base member and the standing parts of the cord ends.

14. A tied article according to claim 13 wherein base member has on the rear thereof a cord-retaining shoulder situated to one side of and facing the central part of the base member, at least one of said wedged cord ends being in a lateral engagement with said shoulder.

15. A tied article having a front surface, a pair of flexible cord ends having standing parts extending in meeting relation along said surface, and a fastener for said cord ends including a rear, base member and an independent front member which is movable bodily away from the base member, said members being shaped to provide opposed clamping faces which are movable toward each other to clamp said cord ends therebetween, said base member being positioned above said standing parts, being extended laterally to engage the said surface of the article, and having inwardly from the margin thereof at least one aperture through which said cord ends are passed to the front, and the rear thereof being shaped to provide a pair of channels extending in opposed directions from said aperture for receiving said standing parts of the cord ends, the said front member having cord-retaining elements on which said ends, after passing through said aperture, are looped with sliding fits and from which said ends extend between said clamping faces in clamped relation.

16. A fastener for securing a pair of flexible cord ends comprising a base member having at least one aperture adjacent the central part thereof for forward passage of the cord ends, and an independent front member movable bodily away from the base member, said members providing pairs of opposed clamping faces situated in divergent directions from said aperture, said front member having a central hole extending therethrough and a pair of lateral holes also extending therethrough, said lateral holes intersecting said central hole near the front end thereof and being inclined rearwardly in divergent directions, said holes being shaped for the sliding reception of said cord ends when passed together through the central hole from the rear and thence separately through said lateral holes into the spaces between said clamping faces.

17. In combination with the fastener according to claim 16, a closure for said central hole detachably secured to the front member at the front thereof.

18. A fastener for securing a pair of flexible cord ends comprising a base member having at least one aperture adjacent the central part thereof for the forward passage of the cord ends, an independent front member movable bodily away from the base member, said members providing pairs of opposed clamping faces situated in divergent directions from said aperture, and a clip secured to the front member including a pair of supports on which said cord ends can extend slidably after emerging from said aperture into the spaces between said clamping faces.

References Cited in the file of this patent

UNITED STATES PATENTS

| | | |
|---|---|---|
| 105,236 | O'Hara | July 12, 1870 |
| 155,535 | Mason | Sept. 29, 1874 |
| 1,368,545 | Childers | Feb. 15, 1921 |
| 2,236,506 | Hirsch | Apr. 1, 1941 |
| 2,443,335 | Vogel | June 15, 1948 |

FOREIGN PATENTS

| | | |
|---|---|---|
| 3,206 | Great Britain | Feb. 18, 1892 |
| 477,709 | Great Britain | Jan. 5, 1938 |
| 626,573 | Germany | Feb. 28, 1936 |